US012472482B2

(12) United States Patent
Liu et al.

(10) Patent No.: US 12,472,482 B2
(45) Date of Patent: Nov. 18, 2025

(54) METHOD OF PRODUCING CARBON MOLECULAR SIEVE MEMBRANES

(71) Applicant: Dow Global Technologies LLC, Midland, MI (US)

(72) Inventors: Junqiang Liu, Freeport, TX (US); Dean M. Millar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 479 days.

(21) Appl. No.: 18/007,386

(22) PCT Filed: Jul. 7, 2021

(86) PCT No.: PCT/US2021/040632
§ 371 (c)(1),
(2) Date: Jan. 30, 2023

(87) PCT Pub. No.: WO2022/026136
PCT Pub. Date: Feb. 3, 2022

(65) Prior Publication Data
US 2023/0278006 A1    Sep. 7, 2023

Related U.S. Application Data

(60) Provisional application No. 63/059,232, filed on Jul. 31, 2020.

(51) Int. Cl.
| | |
|---|---|
| *B01J 20/20* | (2006.01) |
| *B01D 53/22* | (2006.01) |
| *B01D 67/00* | (2006.01) |
| *B01D 71/02* | (2006.01) |
| *B01J 20/28* | (2006.01) |
| *B01J 20/30* | (2006.01) |
| *C01B 32/306* | (2017.01) |
| *C01B 32/318* | (2017.01) |

(52) U.S. Cl.
CPC ............ *B01J 20/20* (2013.01); *B01D 53/228* (2013.01); *B01D 67/0067* (2013.01);
(Continued)

(58) Field of Classification Search
CPC .. B01J 20/20; B01J 20/28033; B01J 20/3078; C01B 32/318; C01B 32/306;
(Continued)

(56) References Cited

U.S. PATENT DOCUMENTS

| | | | | |
|---|---|---|---|---|
| 3,516,791 A | * | 6/1970 | Evans ................... | C01B 32/00 423/330.1 |
| 3,852,429 A | | 12/1974 | Murayama et al. | |

(Continued)

FOREIGN PATENT DOCUMENTS

| | | |
|---|---|---|
| JP | S61101505 A | 5/1986 |
| JP | 2004190023 A | 7/2004 |

(Continued)

OTHER PUBLICATIONS

Saudi Arabia Examination Report dated Aug. 25, 2024, pertaining to SA Patent Application No. 523442332, 2 pgs.

(Continued)

*Primary Examiner* — Anthony J Zimmer
*Assistant Examiner* — Annette Phan
(74) *Attorney, Agent, or Firm* — Dinsmore & Shohl LLP (57) ABSTRACT

A method of forming a carbon molecular sieve membrane includes dissolving a halogenated precursor polymer in a solvent, thereby forming a dissolved halogenated precursor polymer. Homogeneously dehydrohalogenating the dissolved halogenated precursor polymer with an organic amine base to form a partially dehydrohalogenated polymer. Forming a thin film from the partially dehydrohalogenated polymer. Pyrolyzing the thin film to form the carbon molecular sieve membrane.

14 Claims, 3 Drawing Sheets

(52) U.S. Cl.
CPC ...... *B01D 71/021* (2013.01); *B01J 20/28033* (2013.01); *B01J 20/3078* (2013.01); *B01J 20/3085* (2013.01); *C01B 32/306* (2017.08); *C01B 32/318* (2017.08); *B01D 2256/245* (2013.01); *B01D 2257/108* (2013.01); *B01D 2257/504* (2013.01)

(58) Field of Classification Search
CPC .......................... B01D 53/228; B01D 67/0067; B01D 67/006; B01D 2257/504; B01D 2257/108
See application file for complete search history.

(56) References Cited

U.S. PATENT DOCUMENTS

| | | | |
|---|---|---|---|
| 4,774,294 A | * | 9/1988 | Gurgiolo .............. H05K 9/0083 526/310 |
| 2019/0099740 A1 | | 4/2019 | Jimenez Cruz et al. |

FOREIGN PATENT DOCUMENTS

| | | |
|---|---|---|
| WO | 2017083473 A1 | 5/2017 |
| WO | 2017160815 A1 | 9/2017 |
| WO | 2018187004 A1 | 10/2018 |

OTHER PUBLICATIONS

Saudi Arabia Office Action dated Jan. 2, 2024, pertaining to SA Patent Application No. 523442332, 14 pgs.

International Search Report and Written Opinion dated Oct. 25, 2021, pertaining to Int'l Patent Application No. PCT/US2021/040632, 9 pgs.

Wang et al. "Synthesis of chlorinated and anhydride-modified low density polyethylene by solid-phase chlorination and grafting—improving the adhesion of a film-forming polymer", RSC Adv. 2014, 4, 12490-12496.

Brazilian Technical Report dated Apr. 24, 2025, pertaining to BR Patent Application No. BR112023/001772.6, 7 pgs.

\* cited by examiner

METHOD OF PRODUCING CARBON MOLECULAR SIEVE MEMBRANES

CROSS REFERENCE TO RELATED APPLICATIONS

This application is a national stage entry of PCT/US2021/040632 filed on Jul. 7, 2021, which claims priority to U.S. Provisional Patent Application No. 63/059,232 filed on Jul. 31, 2020, the entire disclosures of which are hereby incorporated by reference.

TECHNICAL FIELD

Embodiments of the present disclosure generally relate to methods of producing carbon molecular sieve (CMS) membranes. In particular embodiments relate to a method for producing CMS membranes from dehydrohalogenated polymers having double bonds and improved solubility.

BACKGROUND

Membranes are widely used for the separation of gases and liquids, including for example, separating acidic gases, such as $CO_2$ and $H_2S$, from natural gas. Membranes can also be used to remove $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties that may exceed those of polymeric membranes.

Carbon molecular sieves (CMS) and CMS membranes may be prepared from a variety of precursor polymers that are pyrolyzed at various temperatures and/or under various conditions. The pyrolysis reduces the precursor polymers to carbon, but maintains at least some porosity, in the form of micropores, in the pyrolyzed product. The CMSs thus formed may then be employed in conventional gas separations equipment employing adsorption of particular gases, such as packed beds, columns, and the like.

However, there is a particular challenge in the art to prepare CMS membranes with improved processability. Generally, conventional precursor polymers are insoluble in common solvents. This may slow down the production speed of CMS membranes or even impede the production process. Accordingly, there is a need for precursor polymers having increased solubility to improve processability.

SUMMARY

Embodiments of the present disclosure address these and other needs by homogeneously dehydrohalogenating precursor polymers. Conventional precursor polymers may be heterogeneously dehalogenated to be used for producing CMS membranes. The heterogeneous dehalogenation can cause unevenly dehalogenated polymers and layers with uneven dehalogenation within the layer, such as extensive dehalogenation at the surface of the layer and limited dehalogenation near the center of the layer. The unevenly dehalogenated polymers may have not only double bonds, but also triple bonds and inter-polymer chain crosslinking. Consequently, the polymers may become insoluble in common solvents, which may slow down the production speed or even impede the production process.

The methods for producing CMS membranes of the present disclosure may include homogeneously dehydrohalogenating precursor polymers. These homogeneously dehydrohalogenated precursor polymers have double bonds, which crosslink upon heating, without triple bonds and inter-polymer chain crosslinking. Thus, homogeneously dehydrohalogenated precursor polymers disclosed and described herein may be soluble in solvents commonly used to process thin film membranes. These thin film membranes may easily be converted to CMS membranes by a single thermal pyrolysis step without melting. The homogeneously dehydrohalogenated polymers may have increased solubility and thereby improve processability of producing CMS membranes.

According to one or more aspects of the present disclosure, a method of forming a carbon molecular sieve membrane comprising: dissolving a halogenated precursor polymer in a solvent, thereby forming a dissolved halogenated precursor polymer; homogeneously dehydrohalogenating the dissolved halogenated precursor polymer with an organic amine base to form a partially dehydrohalogenated polymer; forming a thin film from the partially dehydrohalogenated polymer; and pyrolyzing the thin film to form the carbon molecular sieve membrane.

Additional features and advantages of the embodiments disclosed and described herein will be set forth in the detailed description which follows, and in part will be readily apparent to those skilled in the art from that description or recognized by practicing the described embodiments, including the detailed description which follows, the drawings, and the claims.

BRIEF DESCRIPTION OF THE DRAWINGS

The following detailed description of specific embodiments of the present disclosure can be best understood when read in conjunction with the drawings enclosed herewith.

DETAILED DESCRIPTION

As used throughout this disclosure, the term "polymer" refers to a polymeric compound prepared by polymerizing monomers, whether of the same or a different type. A "copolymer" may refer to a polymer comprising two monomers or to a polymer comprising three or more monomers.

"Polyvinyl chloride (PVC)" as used herein refers to a synthetic resin produced by the polymerization of vinyl chloride.

"Chlorinated polyvinyl chloride (CPVC)" as used herein refers to a synthetic resin produced by chlorination of polyvinyl chloride (PVC) resin "Polyvinylidene chloride (PVDC)" as used herein refers to a synthetic resin produced by the polymerization of vinylidene chloride.

"Polyvinylidene fluoride (PVDF)" as used herein refers to a synthetic resin produced by the polymerization of vinylidene fluoride.

"Dehydrohalogenation" as used herein refers to the removal of both hydrogen atoms and a halogen atoms (i.e., fluorine, chlorine, bromine, iodine, and astatine), for example from polymers. The term "dehydrohalogenation" includes "dehydrofluorination," "dehydrochlorination," "dehydrobromination," and "dehydroiodination" of polymers."

"Homogeneously dehydrohalogenation" as used herein refers to the removal of both a hydrogen atom and a halogen atom, for example from polymers to form dehydrohalogenated polymer having single bond, double bonds, or both, without triple bond, inter-polymer chain crosslinking, or both. When polymers are homogeneously dehydrohalogenated, both the polymer and the dehydrohalogenation agent are in the same phase, for example, both in a liquid solution. When polymers are heterogeneously dehydrohalogenated, the polymer and the dehydrohalogenation agent are not in the same phase, for example, the polymer is a solid and the dehydrohalogenation agent is dissolved in a liquid or in a gas phase.

When polymers are heterogeneously dehydrohalogenated, the polymer may not dissolve or disperse in the solvent so that only parts of the polymer chain (such as the surface of the particle) are available to interact with the solvent and the dehydrohalogenating agent. Consequently, only the exterior surface of the polymer may be dehydrohalogenated and the interior of the polymer particle may not be modified. At the exterior polymer surface, there is a local abundance of dehydrohalogenating agent, which causes over dehydrohalogenation and crosslinking of the polymer.

When polymers are homogeneously dehydrohalogenated, the polymer may dissolve and disperse in the solvent making essentially all of the polymer chain available to interact with the solvent and dehydrohalogenating agent. In this instance, dehydrohalogenation may take place anywhere and on any part of the polymer chain resulting in a much higher degree of modification for the same concentration of dehydrohalogenating agent and reaction time. The resulted polymer may be essentially uniform in composition. The dehydrohalogenation may be controlled by the stoichiometry of the base added.

"Partially dehydrohalogenated polymer" as used herein refers to a dehydrohalogenated polymer where at least one hydrogen atom and at least one halogen atom, but intentionally not all hydrogen and halogen atoms, are removed from the polymer. When polymers are heterogeneously dehydrohalogenated, the polymers will also be partially dehydrohalogenated because the active agent intentionally cannot access the interior of the polymer particle leaving a large portion of the polymer unmodified.

Embodiments of the present disclosure are directed to methods of forming a carbon molecular sieve membrane comprising: dissolving a halogenated precursor polymer in a solvent, thereby forming a dissolved halogenated precursor polymer; homogeneously dehydrohalogenating the dissolved halogenated precursor polymer with an organic amine base to form a partially dehydrohalogenated polymer; forming a thin film from the partially dehydrohalogenated polymer; and pyrolyzing the thin film to form the carbon molecular sieve membrane.

Methods according to embodiments include dissolving a halogenated precursor polymer in a solvent. A "halogenated precursor polymer" may refer to any polymer having functionalized, grafted, or copolymerized therein at least one type of monomer or polymer containing a halogen atom (i.e., fluorine, chlorine, bromine, iodine, and astatine). In one or more embodiments, the halogen of the halogenated precursor polymer can be selected from fluorine, chlorine, bromine, and mixtures thereof.

In one or more embodiments, the halogenated precursor polymer may be a halogen-containing vinyl or vinylidene polymer or a resin in which the halogen is attached directly to the carbon atoms. In embodiments, the halogenated precursor polymer may be a vinyl halide polymer, such as a vinyl chloride polymer. In one or more embodiments, the halogenated precursor polymer may be selected from the group consisting of PVC; CPVC; PVDC copolymer, PVDF copolymer, chlorinated polyethylene; chlorinated natural and synthetic rubber; rubber hydrochloride; chlorinated polystyrene; brominated polystyrene; brominated natural and synthetic rubber; polyvinyl bromide; butadiene styrene brominated copolymer; other brominated polymers; polyvinyl fluoride; copolymers of vinyl chloride with one or more copolymerizable ethylenically unsaturated monomers selected from vinyl acetate, vinyl butyrate, vinyl benzoate, vinylidene chloride, an alkyl fumarate, an alkyl maleate, vinyl propionate, an alkyl acrylalte, an alkyl methacrylate, methyl alpha-chloroacrylate, styrene, trichloroethylene, a vinyl ether, a vinyl ketone, 1-fluoro-2-chloroethylene, acrylonitrile, chloroacrylonitrile, allylidene diacetate, chloroallylidene diacetate, and mixtures of two or more thereof.

The halogenated precursor polymer, such as PVC, CPVC, PVDC, PVDF, or mixtures of two or more thereof, may be made by any process known or hereafter discovered in the art, including suspension, emulsion, solution, and bulk or mass polymerization.

Commercially available brominated polymers may include, for example, Emerald Innovation™ 1000 (product of Chemtura Corporation) and Emerald Innovation™ 3000 (CAS number 1195978-93-8; product of Chemtura Corporation).

When a chlorinated polyethylene is used, such polymer may have from 14 to 75 wt. % (e.g., 36 wt. %) chlorine. The chlorinated polyethylene also includes chlorinated and anhydride-modified low-density polyethylene prepared by solid-phase chlorination and grafting (RSC Adv., 2014, 4, 12490-12496). Commercially available chlorinated polyethylene may include, for example, TYRIN™ chlorinated polyethylene (a product of The Dow Chemical Company). The chlorinated polyethylene may be made by any process known or hereafter discovered in the art, including solid-state, melt-state or gas-phase chlorination.

In one or more embodiments, a PVDC may include at least 60 wt. % of vinylidene chloride, based on total weight of the copolymer, and in embodiments at least 70 wt. %. It is further desired that the PVDC contains a maximum of 97 wt. % vinylidene chloride, and thus contains a minimum of at least 3 wt. % of the comonomer or comonomer combination; such as from 3 wt. % to 40 wt. %, from 3 wt. % to 30 wt. %, or from 3 wt. % to 20 wt. %. In some embodiments, the PVDC may include an acrylate, such as methyl acrylate, ethyl acrylate, butyl acrylate, or a combination thereof, in an amount from 3 wt. % to 20 wt. %, based on the weight of the PVDC as a whole; such as from 3.5 wt. % to 15 wt. %, from 4 wt. % to 12 wt. %. In some embodiments, the PVDC may include vinyl chloride in an amount from 3 wt. % to 30 wt. %; such as from 7 wt. % to 28 wt. %, or from 9 wt. % to 25 wt. %.

According to embodiments, the halogenated precursor polymer may include additives. Additives may include, but are not necessarily limited to, epoxidized oil stabilizers such as epoxidized soybean oil, epoxidized linseed oil, and the diglycidyl ether of bisphenol A. In embodiments, additives include liquid plasticizers, such as aliphatic and aromatic esters, including for example dibutyl sebacate, acetyl tributyl o citrate, dioctyl phthalate, and the like, and combinations thereof. Other additives, according to embodiments, may include lubricants, such as polyethylene wax, paraffin wax, oxidized polyethylene wax, high density polyethylene, acrylate copolymers, and silicone polymers, and combinations thereof. Another group of additives that may be included, according to one or more embodiments, are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the halogenated precursor polymer. According to embodiments, the total amount of all additives in the halogenated precursor polymer is less than 15 wt. %, such as less than 8 wt. %, or less than 3 wt. %. In some embodiments, the total amount of all additives combined in the halogenated precursor polymer is greater than 2 wt. %. In one or more embodiments, the total amount of all additives in the halogenated precursor polymer is from 2 wt. % to 8 wt. %, or from 2 wt. % to 3 wt. %.

As stated above, the halogenated precursor polymer, including any additives, may be dissolved in the solvent. The halogenated precursor polymer may be dissolved in the solvent, such as by heating, agitating, and the like. The solvent may be selected from the group consisting of 1,3-dibromopropane, bromobenzene, chlorobenzene, dichlorobenzene, 1-chloronaphthalene, 2-methylnaphthalene, o-dichlorobenzene, hexamethylphosphoramide, tetramethylene sulfoxide, N-acetylpiperidine, N-methylpyrrolidinone, N-formylhexamethyleneimine, trimethylene sulfide, N-n-butylpyrrolidinone, diisopropyl sulfoxide, N-formylpiperidine, N-acetylpyrrolidinone, tetrahydrothiophene, N,N-dimethylacetamide, dimethylformamide, cyclooctanone, cycloheptanone, cyclohexanone, cyclopetanone, 2-butanone, di-n-butyl sulfoxide, tetrahydrofuran, 1,4-dioxane, ethyl acetate, and mixtures thereof.

In one or more embodiments, the halogenated precursor polymer may be present in an amount from 0.1 wt. % to 50 wt. % based on the combined weight of the halogenated precursor polymer, including any additives, and the solvent. In embodiments, the halogenated precursor polymer may be present in an amount ranging from 0.1 wt. % to 40 wt. %, from 0.1 wt. % to 35 wt. %, or from 1 wt. % to 20 wt. % based on the combined weight of the halogenated precursor polymer, including any additives, and the solvent. Once the halogenated precursor polymer is dissolved in the solvent, it can be referred to as a dissolved halogenated precursor polymer.

Next, methods according to embodiments disclosed and described herein that include homogeneously dehydrohalogenate a dissolved halogenated precursor polymer with an organic amine base to form a partially dehydrohalogenated polymer will be described.

The dissolved halogenated precursor polymer may be homogeneously dehydrohalogenated by an acid-base reaction with an organic amine base. The dissolved halogenated precursor polymer contains multiple halogen and hydrogen atoms on a carbon backbone. According to embodiments, a portion of the halogen and hydrogen atoms are removed from the dissolved halogenated precursor polymer by the acid-base reaction.

The dissolved halogenated precursor polymer may not have an internal crystal structure. When "dissolved" the polymer may lose its solid state structure. The halogenated precursor polymer may have an internal crystal structure prior to dissolution, and if not modified, this crystal structure may be reestablished after solvent removal, such as through recrystallization. The homogeneous dehydrohalogenation process may alter the internal crystal structure of the solidified halogenated precursor polymer by removing a portion of the halogen and hydrogen atoms, from the dissolved halogenated precursor polymer. In addition, the homogenous dehydrohalogenation process uniformly removes hydrogen and halogen atoms along the carbon backbone such that single bonds along the carbon backbone are replaced with double bonds. For instance, in embodiments, when a hydrogen atom is removed from the carbon backbone, a corresponding halogen atom attached to an adjacent carbon on the carbon backbone is also removed so that a double bond is formed between adjacent carbon atoms in the backbone.

When the polymer is homogeneously dehydrohalogenated, dissolution of the polymer particle necessarily may destroy the crystalline structure. If unreacted and allowed to re-solidify, the crystalline structure may be reestablished. However, if the dissolved polymer is dehydrohalogenated while in solution, the resulting double bonds may prevent reestablishment of the crystalline structure upon solidification. Consequently, the dehydrohalogenated polymers may be less rigid and more rubbery. The higher the degree of dehydrohalogenation, the more rubbery the resolidified polymer may be. In contrast, when the polymer is heterogeneously dehydrohalogenated, the polymer may be a crystalline solid with a defined 3-dimensional structure and the particle may have defined accessible external surface and inaccessible internal regions. During the dehydrohalogenation reaction, only the accessible external surfaces may be modified and the internal structure may not be modified. Consequently, crystalline structure within the particles may not necessarily be disrupted.

In one or more embodiments, less than 20 wt. % of the dissolved halogenated precursor polymer may be homogeneously dehydrohalogenated by the organic amine base. In some embodiments, from 0.1 wt. % to 20 wt. %, from 1 wt. % to 20 wt. %, from 3 wt. % to 20 wt. %, from 5 wt. % to 20 wt. %, 1 wt. % to 15 wt. %, from 2 wt. % to 15 wt. %, from 3 wt. % to 15 wt. %, or from 5 wt. % to 15 wt. % of the dissolved halogenated precursor polymer may be homogeneously dehydrohalogenated in the organic amine base. The degree of dehydrohalogenation as a percent of the original halogen content may be determined using a variety of analytical methods. Examples include but are not limited to nuclear magnetic resonance (NMR), elemental analysis (EA), thermogravimetric analysis (TGA) or x-ray photoelectron spectroscopy (XPS).

The organic amine base may be dissolved in the solvent. In one or more embodiments, the organic amine base may comprise protic amines, hydroxides, or both. Protic amines may include mono amines, dialkyl amines, cyclic amines, aromatic amines, or combinations thereof. Hydroxides my include ammonium hydroxide, tetraalkyl ammonium hydroxide, alkali metal hydroxides, alkaline earth hydroxides, rare earth hydroxides, or combinations thereof.

As previously disclosed, the partially dehydrohalogenated polymer may be formed by an acid-base reaction between the dissolved halogenated precursor polymer and the organic amine base that removes a portion of the hydrogen and halogen atoms from the carbon backbone of the polymer.

The halogen and hydrogen atoms that are removed from the carbon backbone may also react with each other and/or the organic amine base to form a salt that precipitates out of solution allowing the partially dehydrohalogenated polymer, which remains dissolved in the solvent, to be separated from the hydrogen and halogen atoms removed from the carbon backbone by traditional separation techniques, such as filtering, centrifuging, and the like.

According to embodiments, the partially dehydrohalogenated polymer has single and double bonds along the carbon backbone. The partially dehydrohalogenated polymer does not, according to one or more embodiments, have triple bonds along the carbon backbone or have inter-polymer chain crosslinking.

According to one or more embodiments, after the salts are separated from the partially dehydrohalogenated polymer and the solvent, the partially dehydrohalogenated polymer may also be separated from the solvent. Any conventional separating method may be used to separate the partially dehydrohalogenated polymer from the solvent, such as drying or centrifuging. In embodiments, the partially dehydrohalogenated polymer is not separated from the solvent.

The partially dehydrohalogenated polymer may be used to form a CMS or CMS membrane. To form a CMS membrane, a method may further include applying the partially dehydrohalogenated polymer to a porous support to form a thin film on the porous support. If the partially dehydrohalogenated polymer is not separated from the solvent after the dehydrodehalogenation, the solvent and partially dehydrohalogenated polymer mixture may be applied to the porous support. However, in embodiments where the partially dehydrohalogenated polymer is separated from the solvent, the partially dehydrohalogenated polymer may be re-dissolved in a second solvent so that the partially dehydrohalogenated polymer may be applied to the porous support as a thin film. The second solvent may be the same as or different from the first solvent used in the dehydrohalogenation step. In embodiments, the second solvent may be selected from the group consisting of N-methyl-2-pyrrolidone (NMP), 1,3-dibromopropane, bromobenzene, chlorobenzene, dichlorobenzene, 1-chloronaphthalene, 2-methylnaphthalene, o-dichlorobenzene, hexamethylphosphoramide, tetramethylene sulfoxide, N-acetylpiperidine, N-methylpyrrolidinone, N-formylhexamethyleneimine, trimethylene sulfide, N-n-butylpyrrolidinone, diisopropyl sulfoxide, N-formylpiperidine, N-acetylpyrrolidinone, tetrahydrothiophene, N,N-dimethylacetamide, dimethylformamide, cyclooctanone, cycloheptanone, cyclohexanone, cyclopetanone, 2-butanone, di-n-butyl sulfoxide, tetrahydrofuran, 1,4-dioxane, ethyl acetate, and mixtures thereof. Because the partially dehydrohalogenated polymer has been homogenously dehydrohalogenated, the partially dehydrohalogenated polymer can be dissolved in solvents conventionally used to apply membranes to porous supports, such as, for example tetrahydrofuran (THF).

In other embodiments, the partially dehydrohalogenated polymer may be formed to be a free standing membrane, such as a flat sheet, or hollow fiber. In such embodiments, the partially dehydrohalogenated polymer is not applied to a porous support. Instead, the partially dehydrohalogenated polymer maybe formed into a flat sheet or a molded into a desired shape, such as by using a mold. In such embodiments, the partially dehydrohalogenated polymer may or may not be present in a solvent.

The thin film, whether on a porous support or as a free standing component may have a thickness ranging from 1 micrometers (μm) to 1000 μm, 1 μm to 500 μm, from 2 μm to 500 μm, or 5 μm to 200 μm.

The porous support may include polymeric woven or non-woven cloth, support made from phase separation of polymer solutions. Polymers can be polyolefin, nylon, PET, PVC, PVDF, polyimide, polybenzoxazole, polyacrylonitrile, cellulose acetate, phenol formaldehyde. The surface of the porous support may have a pore size ranging from 1 nm) to 100 micron, from 10 nm) to 10 micron, or from 20 nm to 1 micron.

Next, the method may include pyrolyzing the thin film, whether it is on a porous support or as a free standing article, to form the carbon molecular sieve membrane. The thin film may be pyrolyzed under various inert gas purge and/or vacuum conditions. According to embodiments, the vacuum pyrolysis is conducted at low pressures, such as less than 0.1 millibar. As discussed above, the partial dehydrohalogenated polymer has unsaturated double bond that crosslink upon heating, and thereby the thin film may easily be converted to CMS membrane by a single thermal pyrolysis step without melting.

In one or more embodiments, a pyrolysis temperature may be from 500° C. to 1500° C., from 600° C. to 1500° C., from 700° C. to 1500° C., from 800° C. to 1500° C., from 500° C. to 1200° C., from 600° C. to 1200° C., from 700° C. to 1200° C., from 800° C. to 1200° C., from 500° C. to 1000° C., from 600° C. to 1000° C., from 700° C. to 1000° C., or from 800° C. to 1000° C.

The pyrolysis temperature may be adjusted in combination with the pyrolysis atmosphere to tune the performance properties of the resulting CMS membrane. In some embodiments, the pyrolysis temperature may be maintained from 500° C. to 650° C. The pyrolysis soak time (i.e., the duration of time at the pyrolysis temperature) may vary (and may include no soak time) but advantageously is from 1 hour to 10 hours, from 2 hours to 8 hours, or from 4 hours to 6 hours. An exemplary heating protocol may include starting at a first set point of from 60 to 100° C., from 60 to 80° C., or about 70° C., then heating to a second set point of from 200 to 300° C., from 200 to 250° C., or about 230° C. at a rate of from 10° C. per minute (° C./min) to 20° C./min, or 10° C./min to 15° C./min, then heating to a third set point of from 500° C. to 600° C., or from 500° C. to 550° C., or about 535° C. at a rate of from 2° C./min to 10° C./min, from 2 to 5° C./min, or about 3.85° C./min, and then a fourth set point of from 500 to 600° C., from 500 to 580° C., or about 550° C. at a rate of from 0.1° C./min to 1.0° C./min, from 0.1° C./min to 0.5° C./min, or about 0.25° ° C./min. The fourth set point is then optionally maintained for the determined soak time. After the heating cycle is complete, the system is typically allowed to cool while still under vacuum or in a controlled atmosphere.

In one or more embodiments, the pyrolysis utilizes a controlled purge gas atmosphere in which low levels of oxygen are present in an inert gas. In some embodiments, an inert gas such as argon is used as the purge gas atmosphere. Other suitable inert gases include, but are not limited to, nitrogen, helium, or any combinations thereof. The inert gas containing a specific concentration of oxygen may be introduced into the pyrolysis atmosphere in a controlled manner, such as, for example, through a valve. For example, the amount of oxygen in the purge atmosphere may be less than about 50 parts per million (ppm) O2/Ar. Alternatively, the amount of oxygen in the purge atmosphere may be less than 40 ppm O2/Ar. Embodiments include pyrolysis atmospheres with about 8 ppm, 7 ppm, or 4 ppm O2/Ar.

After pyrolyzing, the CMS membrane that has formed may be cooled to a temperature where no further pyrolysis occurs. Generally, this is a temperature where no decomposition products would be evolved from the precursor polymer and may vary from polymer to polymer. Generally, the temperature is 200° C. or less and typically the temperature is 100° C. or less, 50° C. or less, or typical ambient temperatures (such as 20 to 40° C.). The cooling may be at any useful rate, such as passively cooling (e.g., turning off the power to furnace and allowing to cool naturally). Alternatively, it may be desirable to more rapidly cool such as using known techniques to realize faster cooling such as removing insulation, or using cooling fans or employment of water cooled jackets.

EXAMPLES

The following examples illustrate features of the present disclosure but are not intended to limit the scope of the disclosure.

Comparative Example 1

A base resin available from SK Global SARAN, Midland, MI (PVDC copolymer with 4.8 wt. % methyl acrylate (MA) comonomer, Mw=96,000) was blended with 2 wt. % epoxidized soybean oil (based on total amount of blend), 4 wt. % dibutyl sebacate, and 2 wt. % PLASTISTRENGTH L-1000 an acrylic lubricant available from Arkema PLC, France. The blend was extruded through a 1.75 inch width film die (controlled at 174° C.) followed by water quench and stretch winding. The wind rate was controlled to obtain 2 mil (1 mil=25.4 micrometer) film. The film after winding were cut into approximately 12 inch wide and 2 feet length pieces and laid on flat desktop for about one week. Six coupons of ⅞ inch diameter were cut from the film and soaked in approximately 200 g of the mixed caustic solution (containing 12 mol % KOH, 9% tetrahydrofuran (THF), 42 mol % methanol, and 37 mol % water). Two sets of six coupons were prepared by soaking in the solution for 10 minutes and 4 hours, respectively. The coupons were washed in approximately 200 g distilled water three times to remove the residual solution. The coupons were left dry at room temperature for one hour. This heterogeneous dehydrochlorination is the same as that described in patent: JP2004190023A.

Figure 1:
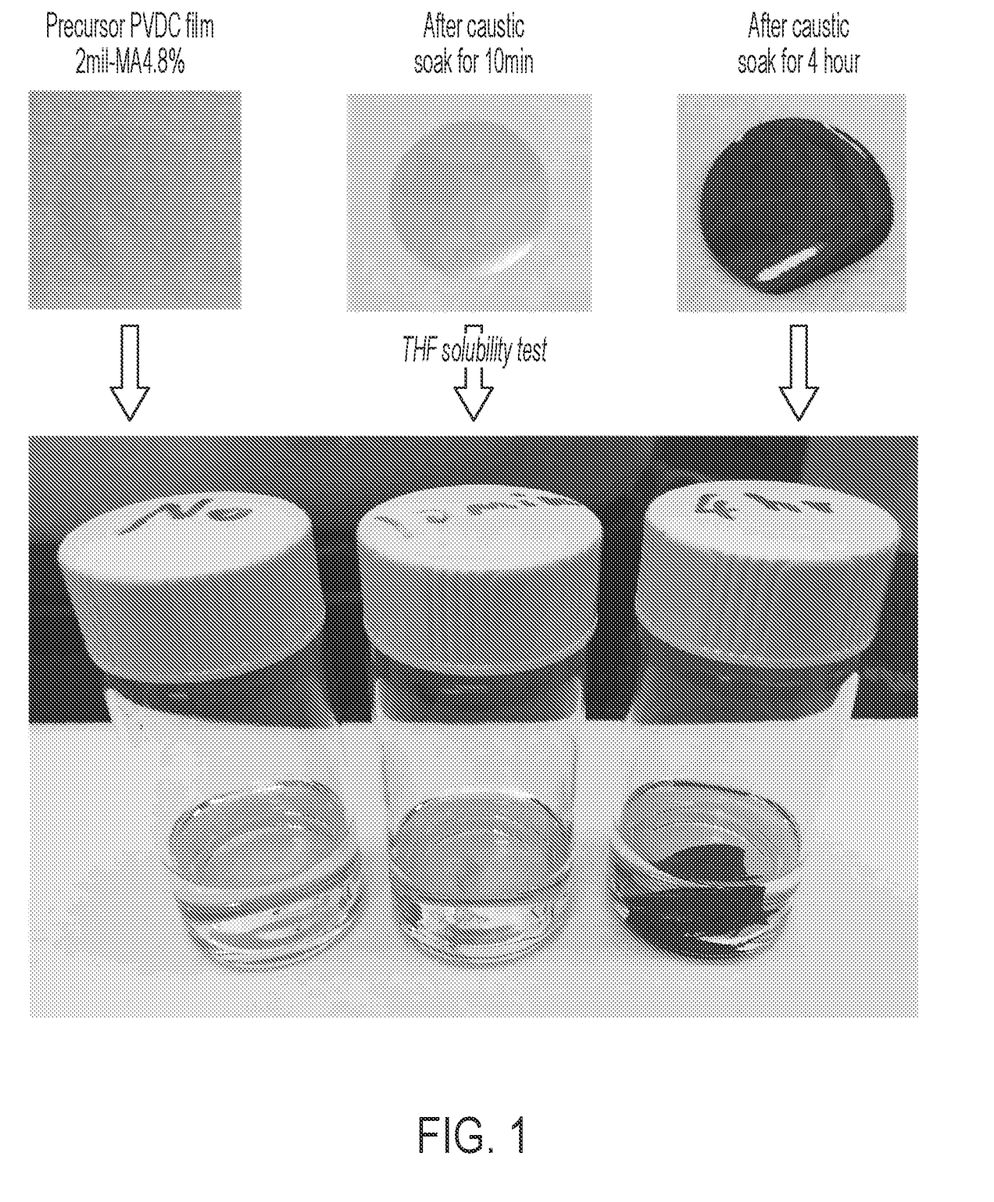
FIG. 1 is a photograph showing the solubility of polymers according to embodiments disclosed and described herein as well as comparative polymers.

As shown in FIG. 1, one piece of each of the treated and the non-treated precursor coupons were immersed in approximately 5 gram of THF solvent. The film treated in the mixed caustic solution for 10 minutes was mostly dissolved except for a thin residue layer. Without being bound by any particular theory, this is believed to be because the dehydrochlorination of the film is controlled by the diffusion of base. On the film surface, there is an abundant amount of base present to dehydrochlorinate the sample to great extent, and the surface of the sample crosslinks. However, the majority of the interior of the film is not changed and therefore is still dissolved in the THF solvent. This is an example of a heterogeneously dehydrohalogenated polymer. The heterogeneous dehydrochlorination is inefficient to deliver a soluble and homogeneous polymer for coating applications. Moreover, the film treated in the mixed caustic solution for 4 hours became complete black in color and not dissolved in the THF solvent anymore. This suggests the film is crosslinked after the treatment.

Example 1

Precursor Polymer

Halogenated Precursor Polymer A is a commercial PVDC resin containing 4.8 wt. % methyl acrylate (MA) comonomer, which was obtained from SK Global SARAN. Halogenated Precursor Polymer B is a commercial PVDC resin containing 8.5 wt. % methyl acrylate (MA) comonomer, which was also obtained from SK Global SARAN.

Homogenous Dehydrohalogenation

A 250 mL 3-neck flask with stirbar was fitted with a valved inlet adapter, reflux condenser with valved inlet adapter, and a pressure equalizing addition funnel. The system was thoroughly purged with $N_2$ and then the adapter on the flask arm closed and the one on the condenser opened to the $N_2$ line and bubbler to maintain small positive pressure. Halogenated Precursor Polymer A (20 g) was added through the arm where the addition funnel was placed followed by tetrahydrofuran (THF) (100 ml). With stirring, the system was heated until the polymer dissolved forming a clear, dark amber solution. Heating was stopped and, upon cooling, the polymer cloud point was reached. At this concentration, the polymer could only be kept in solution when the mixture was close to the boiling point of THF (approximately 70° C.). N-butylamine (1.16 g) was dissolved in 5 mL of THF and added to the addition funnel.

While maintaining a low reflux, the amine was dropped into the polymer solution slowly. The necessary amount of amine was added to achieve the desired degree of dehydrohalogenation. The reaction was rapid as was evidenced by discoloration and darkening of the solution followed by formation of visible needle crystals. Addition took only a few minutes and the dark solution was allowed to stir at temperature for 1 hour. At that point, heating was stopped and the mixture allowed to cool under positive pressure nitrogen. The needles were collected by filtering through a course glass fritted funnel and washed with small aliquots of fresh THF. The polymer solution was then transferred to a 1 L flask and the THF was removed on a rotary evaporator with the bath temperature set at 40° C. to pump to dryness, yielding a dark brown film on the inside of the flask.

A dehydrohalgenated polymer, referred to hereafter as "Dehydrohalogenated Polymer A," formed from Halogenated Precursor Polymer A was obtained by breaking the flask and retrieving the solids. Dehydrohalogenated Polymer A had about 4 mol % Cl elimination from the Halogenate Precursor Polymer A.

Dehydrohalogenated Polymer B was obtained by repeating the above procedure and replacing Halogenated Precursor Polymer A with Halogenated Precursor Polymer B. Dehydrohalogenated Polymer B also had about 4 mol % Cl elimination from the Halogenated Precursor Polymer B. Dehydrohalgenated Polymer B', was obtained by repeating the above procedure for Dehydrohalogenated Polymer B, but added more n-butylamine (2.90 g) Dehydrohalogenated Polymer B' had about 10 mol % Cl elimination from Halogenated Precursor Polymer B.

Membrane Casting—Solubility of Homogeneously Dehydrohalogenated Polymer C

Figure 2:
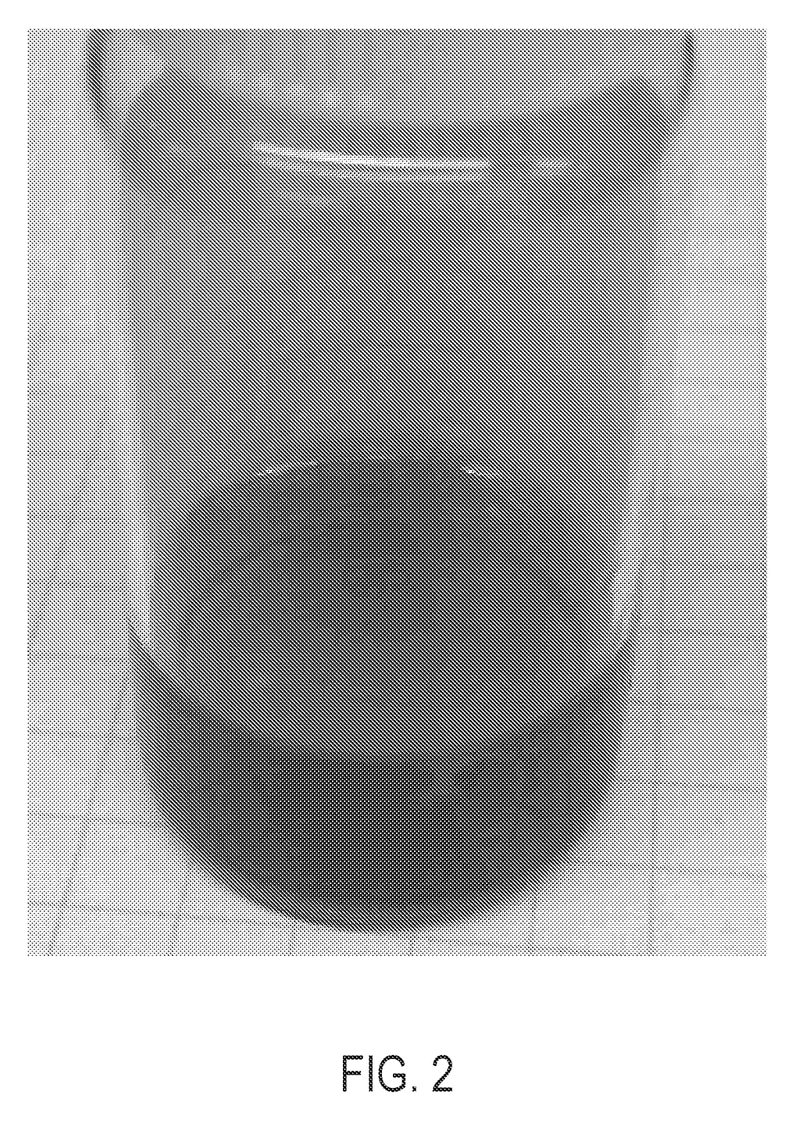
FIG. 2 is a photograph showing the solubility of homogeneously dehydrohalogenated polymer according to embodiments disclosed and described herein in tetrahydrofuran solvent.

About 0.5 g of Dehydrochlorinated Polymer A was added and quickly dissolved into 2.55 g THF in a 16 ml glass vial at room temperature to make a 15 wt. % of homogeneously dehydrohalogenated polymer solution. Halogenated Precursor Polymer A was only soluble in hot THF (about 70° C.). As shown in FIG. 2, the homogeneously Dehydrohalogenated Polymer A solution in THF is clear, which is in contrast to FIG. 1. As discussed below, the soluble dehydrohalogenated PVDC polymer was useful for thin film or coating applications. In addition. the abundant amount of double bonds in the dehydrohologenated PVDC provides routes to crosslink and further functionalization.

The homogeneously Dehydrohalogenated Polymer A solution was poured onto a glass plate and cast using a draw knife with a 28 mil (1 mil=25.4 micron) clearance. The cast film was partially covered to slow down the evaporation of THF solvent, which results in production of smoother membranes. The homogeneously Dehydrohalogenated Polymer A membrane was collected after one day of solvent evaporation and punched into coupons of ¾ inch diameter for following carbonization work.

Similar steps were used to cast the homogeneously Dehydrohalogenated Polymer B and Dehydrochlorinated polymer B' solution. The dried membrane on glass plate was heated to 200° C. at 60° C./min ramp rate and held for 2 minutes in an air convection oven. The solution cast membrane was then collected and punched into coupons of ¼ inch diameter.

Pyrolysis

Multiple coupons of homogeneously Dehydrohalogenated Polymer A membrane were sandwiched between two ceramic honeycomb plates and Whatman filter paper and loaded into a nitrogen purged 5.5" Outside Diameter (OD) quartz tube furnace. A scrubber connected to this furnace contained a 10 wt. % sodium hydroxide aqueous solution. The furnace was raised to a final temperature of 500° C. at a ramp rate of 3° C./min, and held for 30 minutes at the final temperature, then cooled down to room temperature (about 25° C.). After cooling down, the carbon membranes, named as CMS-1, were put into storage box continuously purged with dry nitrogen at a flow rate of 5 Liters/min. CMS-2 membrane was made similarly but using Dehydrochlorinated Polymer B' membrane to form the CMS. Both CMS-1 and CMS-2 membranes were made without the need of a pretreatment step, which simplifies the process. On the contrary, the Halogenated Precursor Polymers A and B have to be pretreated for an extended period (i.e. 150° C. for 12 hours) to avoid the melting of the polymers later during pyrolysis. The final thickness of the two CMS membrane was about 30 micron.

Figure 3:
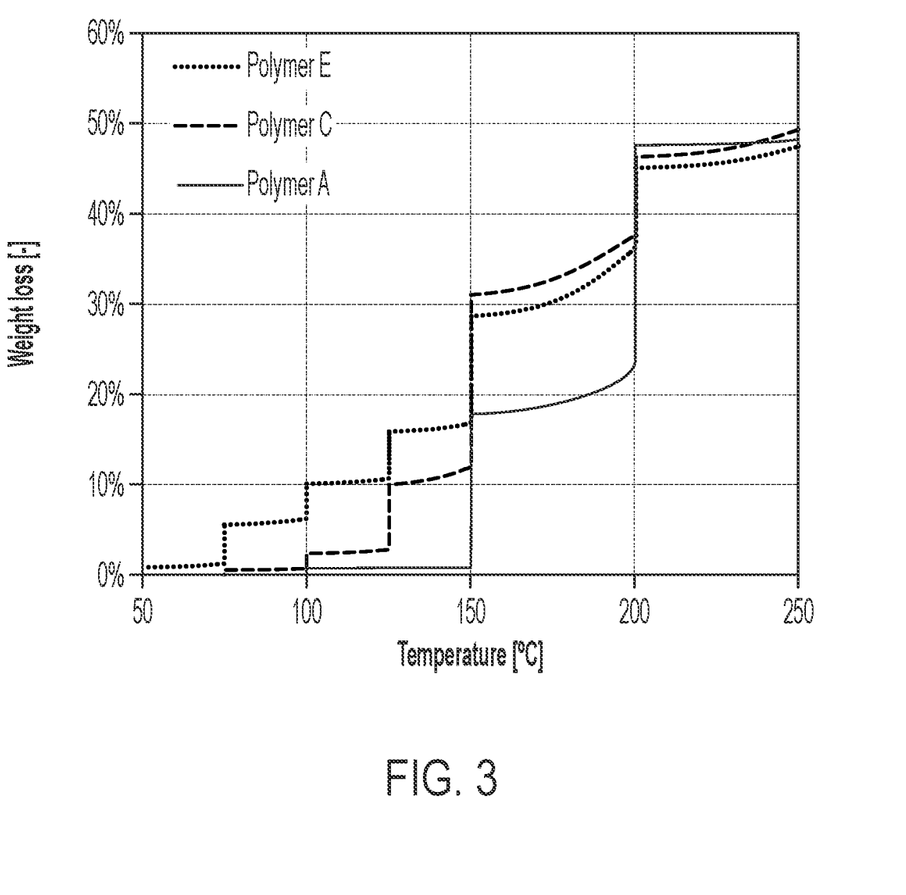
FIG. 3 is a line graph depicting thermal gravimetric analysis (TGA) of polymers according to embodiments disclosed and described herein as well as comparative polymers.

TGA profile in FIG. 3 shows the different thermal decomposition behavior of the two Dehydrochlorinated Polymers A and B' and the Halogenated Precursor Polymer A. The temperature was raised from 50° C. to 250° C. and a hold at every 25° C. incremental temperature for 4 hours. The homogeneously Dehydrochlorinated Polymers A and B' are much easier to decompose and loss weight (due to thermal dehydrochlorination) between 100 to 150° C. compared to the Precursor Polymer A. The Dehydrochlorinated Polymer B' has more than 10 wt. % weight loss at 100° C. The Dehydrochlorinated Polymer A has more than 10 wt. % weight loss at 125° C. The Halogenated Precursor Polymer A, without dehydrochlorination, had to be treated to 150° C. to reach 10 wt. % weight loss. At dehydrochlorination level equivalent to about 10 wt. % weight loss, the chlorinated polymers crosslink and freeze the structure to make carbon membranes. The easy decomposition makes the newly created the Dehydrochlorinated Polymer A and B' ideal for carbon membrane formation.

Characterization

The CMS membranes were masked onto a standard 25 mm filter holder (Millipore #4502500, EMD Millipore Corp., Germany) using an impermeable aluminum tape, leaving open a defined permeation area. A two-part epoxy (J-B Weld twin tube) was then applied along the interface of the tape and the carbon membranes. Mixture gases were tested at 20° C. with a continuous mixed gas feed at the upstream at 1 atm (25 sccm hydrogen, 25 sccm carbon dioxide, 25 sccm methane) and He purge at the downstream (2.0 sccm, 1 atm). The permeate carried by the He purge gas was analyzed by GC (gas chromatograph) with a TCD (thermal conductivity detector for $H_2$ and $CO_2$) and FID (flame ionization detector for $CH_4$ and other hydrocarbons). The concentrations in all cases were lower than 5%, so the gas flow rate in downstream was considered the same as the He flow rate. The permeate rate was calculated using the He purge flow rate times the permeate concentrations measured by GC. Permeation properties of CMS films are listed in Table 1. As shown in Table 1, the CMS membrane 1 and 2 have a high permeance for $H_2$ and $CO_2$.

TABLE 1

Permeation properties of CMS films

| | Carbon Membrane | | | |
|---|---|---|---|---|
| | CMS-1 | | CMS-2 | |
| | Precursor | | | |
| | Dehydrochlorinated Polymer A | | Dehydrochlorinated Polymer B' | |
| | Film # | | | |
| | 1 | 2 | 1 | 2 |
| $H_2$ [Barrer] | 3838 | 3674 | 3065 | 2943 |
| $CO_2$ [Barrer] | 2095 | 2709 | 1039 | 657 |
| $CH_4$ [Barrer] | 23.0 | 31.1 | 8.8 | 5.1 |
| $CO_2/CH_4$ [—] | 91 | 87 | 118 | 128 |
| $H_2/CH_4$ [—] | 167 | 118 | 347 | 572 |

In the Table 2 below, DSC and $^{13}C$ NMR data are shown for Comparative Example 1, which is a PVDC-MA polymer that has not be dehydrochlorinated (4.8% MA), Example 1, which is the PVDC-MA polymer of Comparative Example 1, but dehydrochlorinated to have about 4 mol % of chlorine (Cl) removed, and Example 2, which indicates theoretical values expected for removal of 4 mol % of Cl from the PVDC-MA polymer of Comparative Example 1.

TABLE 2

| | DSC | | $^{13}C$ NMR experimental | | | $^{13}C$ NMR theoretical | | |
|---|---|---|---|---|---|---|---|---|
| | MF (° C.) | $\Delta H_{fus}$ | % $Sp^3$ C | % $Sp^2$ C=C | % $Sp^2$ C=O | % $Sp^3$ C | % $Sp^2$ C=C | % $Sp^2$ C=O |
| Comp. Ex. 1 | 173.7 | 28.4 | — | — | — | 97.7 | 0 | 2.3 |
| Ex. 1 | 152.2 | 20.1 | 95 | 2.4 | 2.6 | 93.9 | 3.8 | 2.3 |

As shown in the above data, dehydrochlorination results in a decrease in the melting point (MP) of the polymer from 174° C. to 152° C., consistent with having disrupted the crystalline nature of the polymer. Similarly, the heat of fusion ($\Delta H_{fus}$) decreases from 28 to 20. Depending on the polymer, the $^{13}C$ NMR can show up to three types of carbon atoms: $Sp^a$ (the carbon participates in 4 single bonds) and two types of $Sp^2$ (the carbon is either double bound to another carbon ($Sp^2$ C=C), or to an oxygen ($Sp^2$ C=O). The $Sp^2$ (C=O) comes from the MA comonomer. The relative amounts of each type of carbon provides important information regarding the nature of the polymer. For the polymer of Comparative Example 1, containing 4.8% MA, only two types of carbons should be found with 98% being Spa and 2% $Sp^2$ from carbonyls (C=O). No $Sp^2$ from carbon-carbon double bonds (C=C) should are observed. Dehydrochlorination is expected to create unsaturation which is seen in the relative amounts of $Sp^2$ (C=C) carbons. For the dehydrochlorinated PVDC-MA polymer of Example 1 (with about 4 mol % Cl removed) the NMR shows 95% $Sp^3$, 2% $Sp^2$ (C=O) and 2% $Sp^2$ (C=C). The observation of $Sp^2$ (C=C) carbons, where none were previously present in Comparative Example 1, is confirmation that dehydrochlorination of the PVDC-MA polymer creates unsaturation (carbon-carbon double bonds). The measured amount of $Sp^2$ (C=C) carbons are lower than what is calculated for that degree of dehydrochlorination, which suggests that under these reaction conditions, about 37% of the dehydrochlorination sites have crosslinked producing a lower numbers of $Sp^2$ (C=C) carbons and higher than theoretical number of $Sp^3$ carbons.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of one or more embodiments does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

The invention claimed is:

1. A method of forming a carbon molecular sieve membrane comprising:
   dissolving a halogenated precursor polymer in a solvent, thereby forming a dissolved halogenated precursor polymer;
   homogeneously dehydrohalogenating the dissolved halogenated precursor polymer with an organic amine base to form a partially dehydrohalogenated polymer;
   forming a thin film from the partially dehydrohalogenated polymer; and
   pyrolyzing the thin film to form the carbon molecular sieve membrane.

2. The method of claim 1, wherein the method further comprises separating the partially dehydrohalogenated polymer from the solvent, and dissolving the partially dehydrohalogenated polymer in a second solvent at room temperature.

3. The method of claim 1, wherein forming a thin film from the partially dehydrohalogenated polymer comprises applying the partially dehydrohalogenated polymer to a porous support.

4. The method of claim 1, wherein the homogeneously dehydrohalogenating results in less than 20.0 weight percent (wt. %) of a total halogen content of the dissolved halogenated precursor polymer being removed.

5. The method of claim 1, wherein the halogenated precursor polymer is selected from the group consisting of polyvinyl chloride (PVC), polyvinylidene dichloride (PVDC) copolymer, poly(vinylidene fluoride) (PVDF) copolymer, chlorinated polyvinyl chloride (CPVC), and mixtures thereof.

6. The method of claim 1, wherein the solvent is selected from the group consisting of 1,3-dibromopropane, bromobenzene, chlorobenzene, dichlorobenzene, 1-chloronaphthalene, 2-methylnaphthalene, o-dichlorobenzene, hexamethylphosphoramide, tetramethylene sulfoxide, N-acetylpiperidine, N-methylpyrrolidinone, N-formylhexamethyleneimine, trimethylene sulfide, N-n-butylpyrrolidinone, diisopropyl sulfoxide, N-formylpiperidine, N-acetylpyrrolidinone, tetrahydrothiophene, N,N-dimethylacetamide, dimethylformamide, cyclooctanone, cycloheptanone, cyclohexanone, cyclopetanone, 2-butanone, di-n-butyl sulfoxide, tetrahydrofuran, 1,4-dioxane, ethyl acetate, and mixtures thereof.

7. The method of claim 1, wherein the organic amine base comprises protic amines, hydroxides, or both.

8. The method of claim 1, wherein the organic amine base comprises one or more protic amines selected from the group consisting of mono and dialkyl amines, cyclic amines, aromatic amines, and combinations thereof.

9. The method of claim 1, wherein the organic amine base comprises one or more hydroxides selected from the group consisting of ammonium hydroxides, tetraalkylammonium hydroxides, alkali metal hydroxides, alkaline earth hydroxides, rare earth hydroxides, and combinations thereof.

10. The method of claim 1, wherein the thin film is pyrolyzed at the temperature of from 500 celsius (° C.) to 1500° C.

11. The method of claim 1, wherein the thin film is pyrolyzed at the temperature of from 500° C. to 650° C.

12. The method of claim 1, wherein the amount of halogenated precursor polymer is from 0.1 to 50 wt. % based on a combined weight of the halogenated precursor polymer and the solvent.

13. The method of claim 1, wherein the amount of organic amine base is from 0.1 to 15 mol. % based on a total halogen content in the halogenated precursor polymer.

14. The method of claim 1, wherein the halogenated precursor polymer is PVDC, the solvent is tetrahydrofuran (THF), and the organic amine base is N-butylamine.

* * * * *